O. C. EMRICK.
SELF FEEDING DEVICE.
APPLICATION FILED MAR. 25, 1918.
1,282,716.
Patented Oct. 22, 1918.
2 SHEETS—SHEET 1.
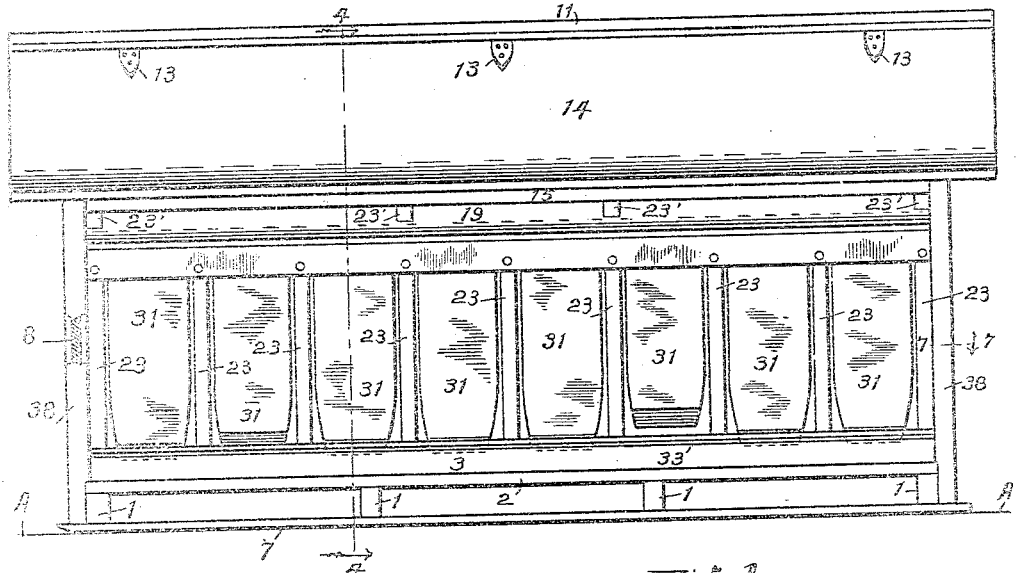
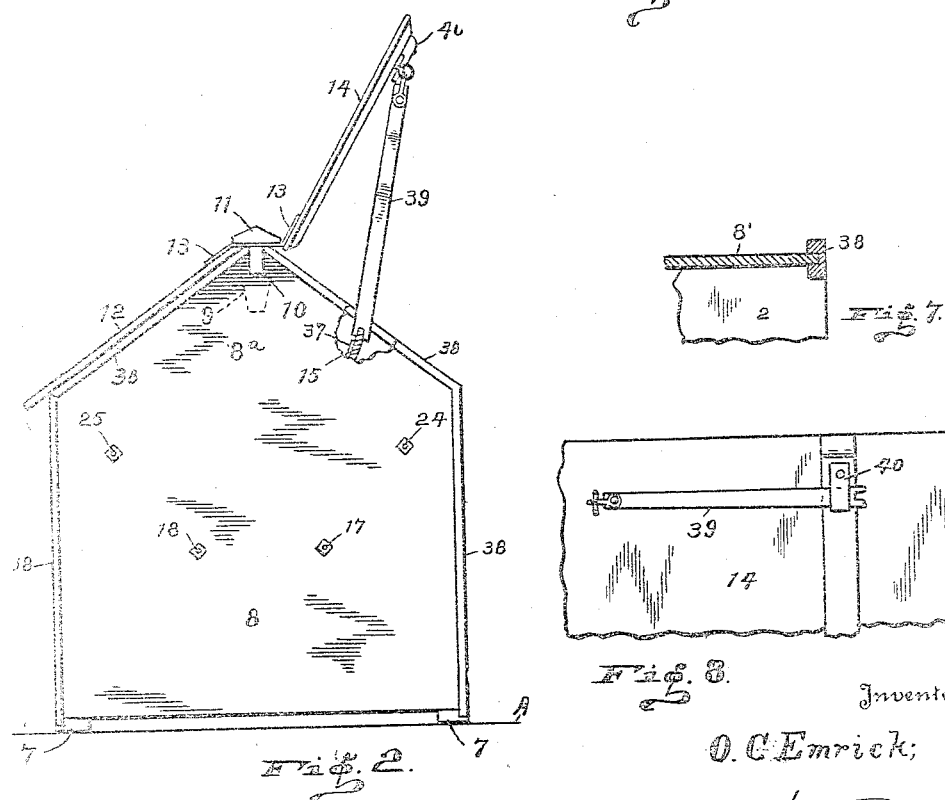
Inventor
O. C. Emrick;

O. C. EMRICK.
SELF FEEDING DEVICE.
APPLICATION FILED MAR. 25, 1918.
1,282,716.
Patented Oct. 22, 1918.
2 SHEETS—SHEET 2.
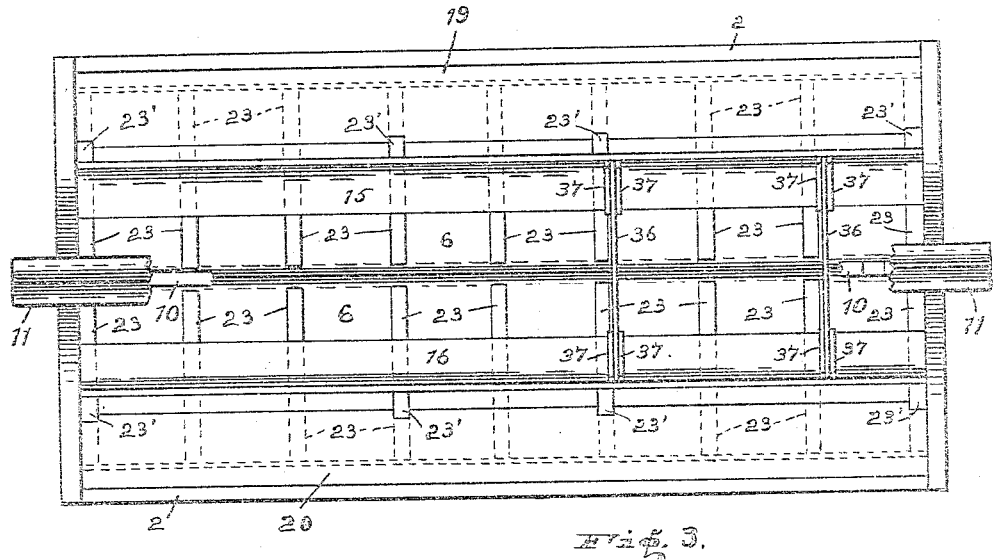
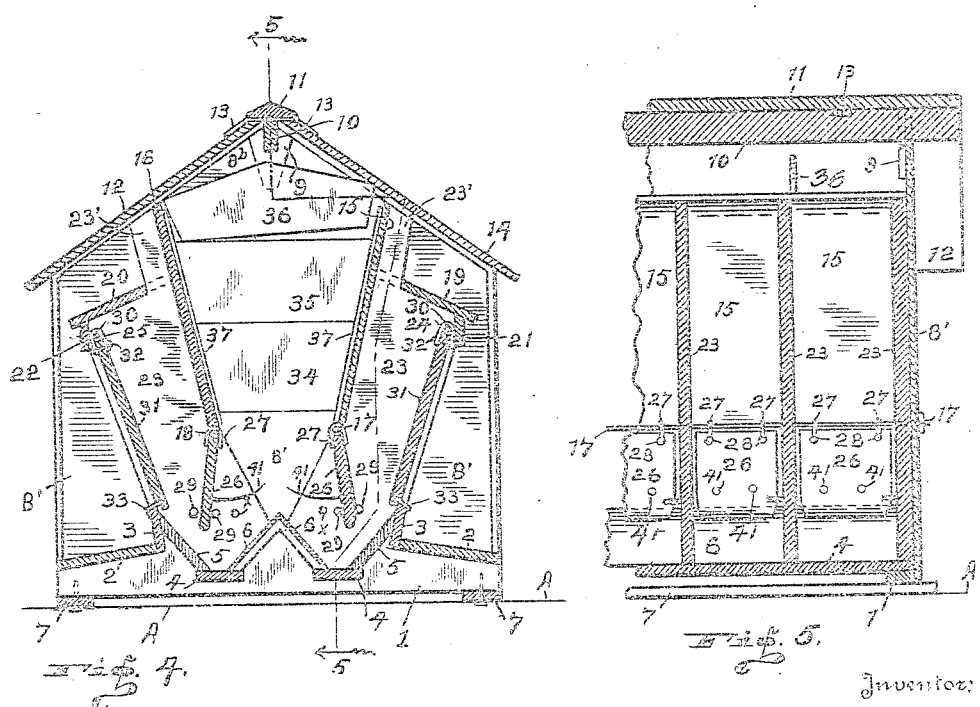
Inventor:
O. C. Emrick

UNITED STATES PATENT OFFICE.

ORPHEUS C. EMRICK, OF LYNN, INDIANA.

SELF-FEEDING DEVICE.

1,282,716.  Specification of Letters Patent.  Patented Oct. 22, 1918.

Application filed March 25, 1918. Serial No. 224,466.

*To all whom it may concern:*

Be it known that I, ORPHEUS C. EMRICK, a citizen of the United States, residing in Lynn, in the county of Randolph and State of Indiana, have invented new and useful Improvements in Self-Feeding Devices, of which the following is a full, clear, and comprehensive specification and exposition, the same being such as will enable others to make and use the same with exactitude.

The object of my present invention, broadly speaking, is to produce a self-feeding device which will be strong and durable in construction, comparatively light in weight, easily managed and controlled, efficient in practice, economical in use, and which can be manufactured and sold at a comparatively low price.

My object also is to provide a self-feeding device, intended more particularly for hogs and pigs, whereby the animal will be enabled to secure the food desired without a particle of waste, the food being inaccessible to birds and fowls, or to other animals and by which various kinds of feed may be placed therein accessible to the stock, and at the same time preserving the feed from the weather, and also providing a device which may be easily moved from place to place.

More particularly stated, my object is to provide a stock feeding device having a plurality of stalls each accessible to but one animal at a time, preventing the animals from crowding one another, enabling them to eat more deliberately, and absolutely preventing the animals from rooting the food out or wasting it in any manner.

Other objects and particular advantages of my invention will be brought out in the course of the following description, and that which is new will be correlated in the appended claims.

One manner for carrying out the various features of my invention in a practical manner is shown in the accompanying two sheets of drawings, in which—Figure 1 is an elevation of one side of the complete construction, as it would appear in practice. Fig. 2 is an end elevation of the assembled construction, showing the top open for the purpose of placing feed in the receptacle. Fig. 3 is a top plan view with the roof removed. Fig. 4 is a cross section, as taken on the line 4—4 of Fig. 1. Fig. 5 is a detail section, as taken on the line 5—5 of Fig. 4. Fig. 6 is a detail showing one of the sills or joists alone. Fig. 7 is a detail cross section of one corner of the device, as taken on the line 7—7 of Fig. 1. And Fig. 8 shows the inner face of the movable roof section with the prop folded and secured thereto.

Similar indices denote like parts throughout the several views.

In order that the construction, the operation, and the advantages of my invention may be fully understood and appreciated, I will now take up a detailed description thereof in which I will set forth the invention as fully and as comprehensively as I may.

In the drawings letter A denotes the ground line.

The base of the device includes the sills or joists 1, of which there are four in this instance, they being of novel shape and all identical with each other, their lower edges being straight, while their upper edges comprise the outer sloping surfaces $b$ and $b$, the central angular surfaces $c$ and $c$ which extend upward convergently joining together at their upper ends, the two lower horizontal surfaces $d$ and $d$, and the outwardly and upwardly sloping surfaces $e$ and $e$.

Numeral 2 denotes the two water shedding floors or tables on which the front feet of the animal may stand when it is feeding, said floors being secured on the surfaces $b$—$b$ and connecting all of the spaced apart sills 1 as shown.

Secured to and extending upwardly from the inner edges of the members 2, also connecting all of the sills, are the plates 3.

Secured to and fitting the notches formed by the surfaces $d$—$d$ are the trough bottoms 4, which also connect all of the sills or joists.

Secured to the surfaces $e$—$e$, connecting all of the sills, are the outer sides 5—5 of the troughs, while the inner sides 6—6 of the troughs are connected at their upper edges.

By this arrangement it will be seen that the base portion comprises two floors 2—2, in which two feed troughs are provided parallel with each other, with means also for locating the outer edges of the troughs above the surfaces of the floors 2.

The base formed substantially as stated is supported by a pair of runners 7 and 7, whereby the device may slide over the ground.

Extending up vertically from the two end sills are the ends 8 and 8' of the device, whose widths are equal to the length of the sills to which they are connected. The upper portions of said ends terminate in the respective gables 8ª and 8ᵇ. Secured in the upper central portion of each gable is a reinforcement yoke 9 in which are secured the ends of the ridge-beam 10 which connects said gables at their peaks. Secured on the upper edge of the ridge beam and projecting outward on each side thereof is the ridge-cap 11. Numeral 12 denotes the fixed member of the roof, the upper edge of which fits under the edge of the cap 11, and it rests on the edges of the gables and projects therefrom both at its lower edge and at the ends. Numeral 13 denotes a plurality of strap hinges one leaf of each of which extends under the cap 11, being notched into the upper edge of the ridge-beam, and they are secured thereto and to the member 12 of the roof. Numeral 14 denotes the movable member of the roof, it being adapted to cover the other half of the device, with its upper edge adapted to extending under the edge of the cap 11 and it is secured to the movable leaves of the hinges 13 whereby the member 14 may be raised and lowered, forming a lid as shown.

Numerals 15 and 16 designate the receptacle walls, which extend between the ends 8 and 8' on each side of the center of the device, projecting from near the respective roof members downwardly and convergently toward the center of the trough members 6, but terminating some distance thereabove, substantially as shown in Fig. 4.

Extending the full length of the device are the two suspension rods 17 and 18, which provide supports for the inner doors, the same being located slightly below the lower edges of the respective walls 15 and 16, and they are secured in the ends 8 and 8' by nuts, or otherwise, and their purpose will hereinafter be explained.

Located some distance below the roof members, extending between the ends 8 and 8', and projecting outward and downward at an angle from the walls 15 and 16, are the water-shedding stall-covers 19 and 20. Projecting down from near the outer edges of the stall covers 19 and 20 are the respective plates 21 and 22.

Each side of the device is divided into a plurality of stalls, by means of the vertical stall partitions 23, all of which are secured between the surfaces of the trough bottoms, the sides 5 and 6, and they are also secured to the walls 15—16, the covers 19—20, and the guard-plates 21—22. All of said stall partitions terminate near the apex of the members 6, and their forward edges are disposed at an angle extending from the lower edges of the plates 21—22 to the outer rim of the troughs. Certain of said stall partitions are formed with an upwardly extending projection 23' which fit in notches therefor formed in the inner edges of the stall covers, and they extend upward to the line of the roof, and provide supports of the upper portions of the walls 15 and 16.

Disposed longitudinally through the device are the rods 24 and 25 which provide the supports for the outer or stall doors, the same being located under the stall-covers 19—20 and near and inward from the respective guard plates 21 and 22.

From the above it will be seen that each of the stalls open outward at the front into the vestibule formed above the floors 2, and they also open inward into the space below the lower end of the food receptacle.

At the inner terminal of each stall there is an inner door 26, each of which is adapted to swing between two of the stall partitions. Said doors 26 are suspended from the rods 17 and 18 by means of U-shaped clevises 27 which are looped over the rods 17 and 18 with their ends secured to the upper portion of the door by means of bolts 28, as shown in Fig. 5. Said doors 26 are adapted to swing in and out, but their movements may be limited in either direction by means of lugs or pins 29 which may be inserted in holes $x$ formed in the sides of the partitions, as shown in Fig. 4.

The outer doors 31 are much longer than are the inner doors, but they are likewise suspended by means of the U-shaped clevises 30, which are looped over the rods 24 and 25 with their ends secured to the upper ends of the doors by means of bolts 32, or otherwise.

A channel is formed across the lower outer edge of each door 31 to fit against the inner edge of coping 33 which are located on the outer edges of the troughs. Also the lower corners of the edges of the doors 31 are formed rounding or beveled, in order to prevent them from becoming engaged with the stall partitions.

It should be noticed that the doors 31 cannot swing out to a vertical position, being always at an angle, but they are adapted to swing inward a limited distance, sufficient in which to expose the interior of the troughs.

The members 34, 35 and 36 together form a partition for the food receptacle, and there may be a plurality of such partitions, but each is located in alinement with certain of the stall partitions. Each of the receptacle partitions is made removable and they are retained in place by gravity, the ends being located in grooves or channels formed by strips 37 which are secured to the walls 15 and 16. Thus it will be seen that the food receptacle may be divided into any number of bins by means of the removable and sectional receptacle partitions.

The edges of the ends 8 and 8' and of the gables 8ª—8ᵇ are covered each by a channeled cap 38, as shown in Fig. 7.

Pivoted at one end to the under-side of the member 14 is the prop 39, which has a notched lower end to stride the upper edge of the wall 15 as in Fig. 2, whereby the lid or member 14 may be retained open. When not in use the prop may be turned to one side parallel with the member 14 and secured by the hook or catch 40. Extending inward and upward from each of the doors 26 is one or more spikes 41, which are adapted to be driven upward when the door 26 is pressed inward, in order to loosen up the feed, if it should become packed in the receptacle.

In practice the feed may be deposited in the receptacle, either dispensing with the partitions and using one kind of feed, or placing therein as many partitions as desired and using various kinds of feed. In either event the feed will gravitate downward and almost fill the two troughs which are below the food which is in the receptacles. After the food is deposited in the receptacle the lid may be closed, and all of the feed in the device will be fully protected from damage or waste either by the weather or by animals other than that for which it is designed.

Now should an animal desire to feed it has only to place its feet on the floor 2, then pressing inward upon the door 31 he will have access to the food in the trough of that particular stall. The amount of food deposited in the troughs will depend on the character of the food and on the position of the inner doors, for in some instances the door 26 may not be limited at all, or it may be limited only as to its outward movements. If the door 26 be permitted to swing inward then of course the animal may press against it which would result in making the food move down freely, also if the food be packed then the spikes will contribute to loosening it up so that it will move down more freely.

I desire that it be understood that various changes may be made in the several details of construction, from that herein shown and described, without departing from the spirit of the invention and without sacrificing any of the advantages thereof which are within the limits of the appended claims.

Having now fully shown and described my invention, what I claim, and desire to secure by Letters Patent of the United States, is—

1. A stock-feeding device comprising a base with troughs extending from end to end thereof, a plurality of stalls located on each side of the troughs, a food receptacle extending from end to end of the device and located directly above the inner sides of the troughs with its sides terminating thereabove, partitions dividing the troughs and extending upward forming the sides of the stalls, covers for the stalls, a door for each stall, said doors being suspended from their upper ends normally closing the stalls but adapted to swing inward, an inner door for each stall the same being suspended from their upper ends and forming continuations of the sides of the food receptacle with their lower edges approaching the inner sides of the troughs, means for limiting the movements of the inner doors, and partitions located in alinement with said stall partitions for dividing the food receptacle in sections.

2. A self-feeding device comprising a plurality of spaced stall partitions, receptacle partitions in alinement with the stall partitions to permit the use of different foods in the various stalls, an inner adjustable door between each stall and the food compartment, an outer door for each stall the same being adapted to swing inward only, stall covers with certain of the stall partitions extending upward only to the stall cover and others extending upward through and beyond the stall covers, a trough section in the bottom of each stall, and a sloping roof covering all of the stalls and the food receptacle.

3. A self-feeding device comprising a base with troughs formed therein, a plurality of vertical partitions extending up from the base and forming stalls which extend to near the center of the device, a food receptacle formed between each set of stalls the sides of which extend down convergently to a mouth located above the base, an inner door for each stall and opening into the space below the food receptacle, an outer door for each stall and adapted to swing inward only, means for swinging each door from its upper end, the lower portions of the edges of the outer doors being formed tapered, a water shed covering the upper end of each outer door, spikes carried by the inner doors and adapted to move toward the mouth of the food receptacle when the inner doors are pushed inward, all substantially as shown and described.

4. A self-feeding device including a base forming two sets of troughs, vertical partitions forming two sets of stalls which extend inward toward the inner sides of the troughs, inner flaring walls forming a food receptacle located between the two sets of stalls and located above the troughs, inner doors hinged at their upper edges and forming downwardly extending continuations of the walls of the food receptacle, there being one of said doors for the inner portion of each stall, a main outer door for each stall, the same being suspended from their upper edges and adapted to swing inward only and adapted to close by gravity, end walls for the device the same forming the ends of the food receptacle, and a cover for the entire device.

5. A self feeding device including supporting runners, joists connecting the runners, a trough on each side of the device and parallel with the runners and supported by the joists, vertical partitions on each side of the device and which divide each side of the device into a plurality of stalls, the stalls of one side being in alinement with the stalls of the other side, water shedding thresholds for the stalls, water shedding covers for the stalls, a central receptacle formed between the two sets of stalls, the same being formed to converge downwardly to a food space therebelow, a suspended door between each stall and said food space, means for limiting the movements of said doors, spikes carried by the inner faces of said doors and adapted to be carried upward into the food receptacle when the doors are pressed inwardly, a suspended outer door for each stall, the same having lower curved edges and being adapted to swing inward only, a roof for the entire device and rods extending longitudinally through the device and on which the doors are suspended, substantially as set forth.

6. A stock feeding device, a base comprising two troughs extending longitudinally of the device and from end to end thereof and adjoining each other whereby the inner sides of the troughs are joined together on the center longitudinal line of the device, an outwardly sloping floor formed at and below the outer edges of the two troughs and extending from the troughs to the ends of the sills, a plurality of sills supporting all of said parts, the upper edges of the sills being shaped to fit the under sides of the troughs and the floors; end walls extending up from the two end sills and terminating in gables, a ridge-beam connecting the gables at their peaks, a food receptacle extending centrally of the device and terminating in a mouth above the troughs, stall partitions located on each side of the food receptacle and dividing the troughs into sections, a suspended gravity door for the outer opening of each of the stalls, a suspended gravity door for the inner opening of each stall, and means for covering each set of stalls, all substantially as shown and described.

In testimony whereof I have hereunto subscribed my name to this specification in the presence of two subscribing witnesses.

ORPHEUS C. EMRICK.

Witnesses:
 ROBT. W. RANDLE,
 R. E. RANDLE.